July 5, 1927.
G. GARDNER
1,634,992
RECORDING ACCELEROMETER
Filed March 29, 1923
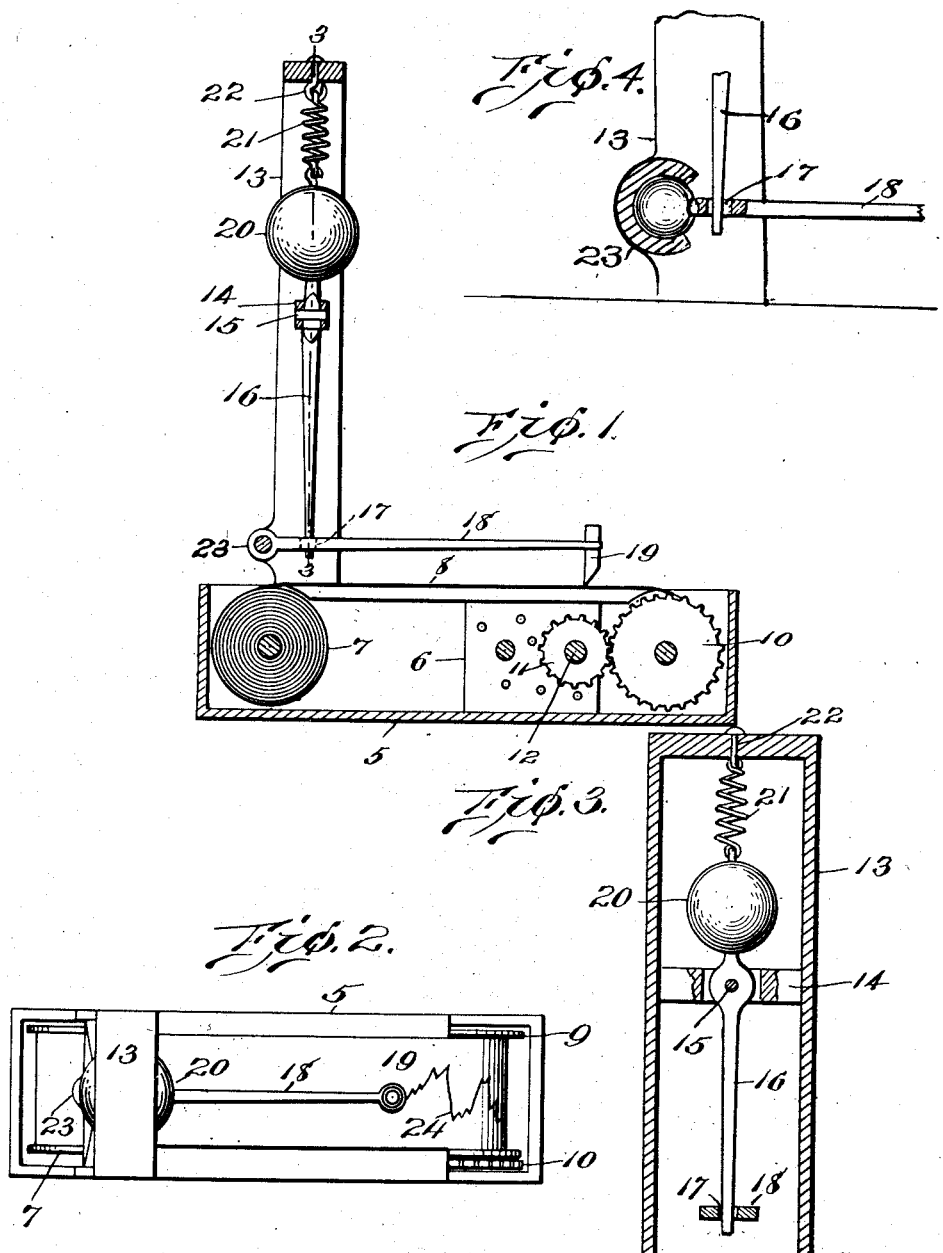
Inventor
Grandison Gardner
By Robert A. Young
Attorney Patented July 5, 1927.

1,634,992

UNITED STATES PATENT OFFICE.

GRANDISON GARDNER, OF DAYTON, OHIO.

RECORDING ACCELEROMETER.

Application filed March 29, 1923. Serial No. 628,664.

This invention relates to accelerometers of the recording type.

The object of the invention is to produce simple apparatus whereby accelerations experienced by an airplane or aircraft of any type, or any other kind of vehicle are recorded by simple, reliable means, on a moving record strip or sheet. One or more of the accelerometers may be mounted upon an aircraft or other vehicle to record both the fore and aft accelerations and transverse accelerations, as well as any other accelerations which it is important to make a record of.

With the above and other objects in view, the invention consists in the novel construction, combination and arrangement herein fully described, shown and claimed.

In the accompanying drawings:

Figure 1 is a vertical longitudinal section through the recording accelerometer.

Figure 2 is a top plan view of the same.

Figure 3 is a vertical transverse section taken on the line 3, 3 of Figure 1.

Fig. 4 is a detail sectional view of the stylus arm mounting.

The apparatus or instrument comprises a suitable casing 5 of oblong, rectangular formation and containing a motor 6, any form of spring motor being adequate for the purpose. At one end of the casing 5 and mounted therein, is a delivery roller 7, on which is wound a record strip, tape or sheet 8, the latter running lengthwise of the casing and being adapted to be wound upon a take-up or receiving roller 9. On one end of the shaft of the roller 9 is mounted a spur gear 10 which is driven by a smaller gear 11 on the power delivering arbor or shaft 12 of the motor 6 as shown in Figure 1.

Suitable means, not shown, known to the art are employed to compensate for the increased size of the take-up roll 10 as the record strip 8 is wound thereon so that the strip will be moved at a uniform rate of speed.

Rising from the casing 5 is an inverted U-shaped frame 13 and between the side members of said frame extends a cross bar 14, the latter supporting the pivot 15 of a normally vertical lever 16. The lever 16 has its lower arm passed through a hole 17 in a stylus carrying arm 18, the stylus 19 carried by said arm resting by gravity on the record strip 8 as shown in the drawings. To the other or upper arm of the lever 16, there is secured a weight 20. A neutralizing or centering spring 21 has one end attached to the weight 20 as shown and the other end secured to the upper part of the frame 13 by any suitable anchoring device 22. The arm 18 is connected by a ball and socket joint 23 to the frame 13, which allows the stylus 19 to move freely upon the surface of the record strip 18 for the purpose of making a record thereon indicated by the irregular or zigzag line 24 as shown in Figure 2.

In the operation of the device herein above described, the whole device is mounted on an aircraft or other movable vehicle or object and may be used singly or in multiple. In other words, one instrument may be used to record longitudinal acceleration while another instrument is used for recording lateral acceleration. A combination of the two results obtained may be easily resolved into a polar acceleration chart. The mechanism is mounted in an airplane in such a way as to bring the accelerations which it is desired to determine, at a right angle to the fulcrum pin or pivot 15. In this position any acceleration brings about a movement of the weight 20. This movement is transferred through the fulcrum pin by the lever 16 to the stylus arm 18 and the stylus thereof traces a record on the strip or tape 8.

It will be observed that the instrument is extremely simple in construction and operation and that accelerations are transmitted through the shortest possible route to the stylus. This and the extreme magnification of movement obtained through the lever and stylus arm combined, causes not only accelerations to be recorded but vibrations and other minute movements of the airplane. The information thus obtained and made a record of is very valuable for use upon bomb sight designs. Furthermore, the mechanism has the advantage of the automatic damping of the movement of the stylus. This is obtained by the slight friction or tracking of the stylus upon the record strip. This is a valuable feature due to the fact that other and more complicated mechanism must be damped and in many cases their design makes it necessary to incorporate dash pots to perform this function.

I claim:

1. A recording accelerometer comprising a motor-driven record strip, a stylus arm mounted on a fulcrum joint and carrying a stylus bearing on said record strip, a pivoted lever having operative connection with said stylus arm, a weight attached to said lever above its pivot, whereby said lever is subject to movement upon acceleration, and spring means connected to said weight for normally retaining said lever and weight in vertical and neutral position.

2. A recording accelerometer device comprising a motor-driven record strip, a stylus arm mounted on a fulcrum joint and carrying a stylus bearing on said record strip, a pivoted lever fulcrumed between its ends and having operative connection with said stylus arm, a weight attached to said lever above its pivot whereby said lever is subject to movement upon acceleration and deceleration, and spring means connected to said weight and to the stationary frame of said device for normally retaining said lever and weight in vertical and neutral position.

3. A recording accelerometer comprising a stationary frame, a motor-driven record strip, a stylus arm mounted on a fulcrum joint and carrying a stylus bearing on said record strip, a pivoted lever having a weight connected thereto above its pivot and to said frame, said lever being in operative connection with said stylus arm, said lever being subject to accelerations, and spring means for resiliently retaining said lever and thereby the stylus-carrying arm in neutral position.

4. A recording accelerometer including a movable record strip, a frame, a stylus arm on said frame and capable of movement relative thereto, a lever pivotally carried by said frame having a weight on the upper end thereof and a connection with the stylus arm at the lower end thereof, and spring means connected to said weight and said frame for resiliently retaining said lever in one position.

In testimony whereof I affix my signature.

GRANDISON GARDNER.